(12) United States Patent
List et al.

(10) Patent No.: US 10,724,634 B2
(45) Date of Patent: Jul. 28, 2020

(54) PARKING LOCK DEVICE FOR A MOTOR VEHICLE

(71) Applicant: ZF Friedrichshafen AG, Friedrichshafen (DE)

(72) Inventors: Matthias List, Friedrichshafen (DE); Bernd Austermann, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 84 days.

(21) Appl. No.: 16/034,973

(22) Filed: Jul. 13, 2018

(65) Prior Publication Data
US 2019/0017599 A1     Jan. 17, 2019

(30) Foreign Application Priority Data

Jul. 14, 2017 (DE) .................. 10 2017 212 093

(51) Int. Cl.
*F16H 63/34*     (2006.01)

(52) U.S. Cl.
CPC ..... *F16H 63/3425* (2013.01); *F16H 63/3433* (2013.01)

(58) Field of Classification Search
CPC .................. F16H 63/3425; F16H 63/3433
See application file for complete search history.

(56) References Cited

U.S. PATENT DOCUMENTS

| | | | |
|---|---|---|---|
| 2,670,064 A | 2/1954 | Hasbany | |
| 4,519,483 A * | 5/1985 | Schlicker | B60T 1/005 |
| | | | 192/219.5 |
| 5,630,339 A * | 5/1997 | Tuday | B60T 1/005 |
| | | | 192/219.5 |
| 8,122,786 B2 | 2/2012 | Kirchner | |
| 8,579,099 B2 | 11/2013 | Austermann et al. | |

(Continued)

FOREIGN PATENT DOCUMENTS

| DE | 3638045 A1 | 5/1988 |
|---|---|---|
| DE | 102006042637 A1 | 3/2008 |

(Continued)

OTHER PUBLICATIONS

German Search Report DE102017212093.2 dated Apr. 4, 2018. (10 pages).

*Primary Examiner* — David R Morris
(74) *Attorney, Agent, or Firm* — Dority & Manning, P.A.

(57) ABSTRACT

A parking lock device for a motor vehicle including a parking interlock gear and a parking pawl. The parking interlock gear has teeth and tooth gaps, wherein each of the teeth has a first and a second deflecting contour that are counter-revolving and radially increasing from a radial indentation toward a respective tooth flank. The parking pawl includes a ratchet tooth. The parking interlock gear is rotatable about an axis of rotation and the parking pawl is rotatable about or translational along a swivel axis parallel to the axis of rotation. The contours slidingly guide the ratchet tooth to catapult over the tooth gaps in a targeted rotational speed range of the parking interlock gear, the targeted rotational speed range being between a minimum limit speed and a maximum limit speed, such that contact is avoided between tooth flanks of the parking pawl and of the parking interlock gear.

10 Claims, 3 Drawing Sheets

(56) References Cited

U.S. PATENT DOCUMENTS

| | | | |
|---|---|---|---|
| 2008/0053170 A1* | 3/2008 | Kirchner | F16D 63/006 |
| | | | 70/174 |
| 2010/0108460 A1* | 5/2010 | Nakamura | F16H 63/3416 |
| | | | 192/219.5 |
| 2012/0097497 A1* | 4/2012 | Austermann | F16H 63/3425 |
| | | | 192/219.5 |

FOREIGN PATENT DOCUMENTS

| | | |
|---|---|---|
| DE | 102010042917 A1 | 4/2012 |
| JP | 2012-144110 A | 8/2012 |

\* cited by examiner

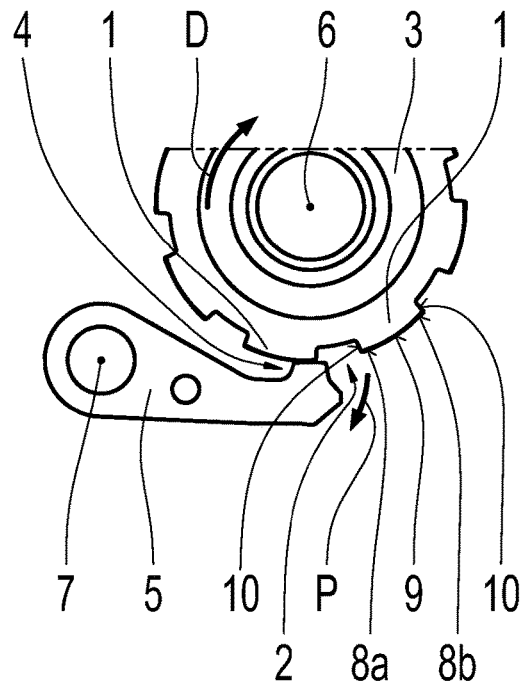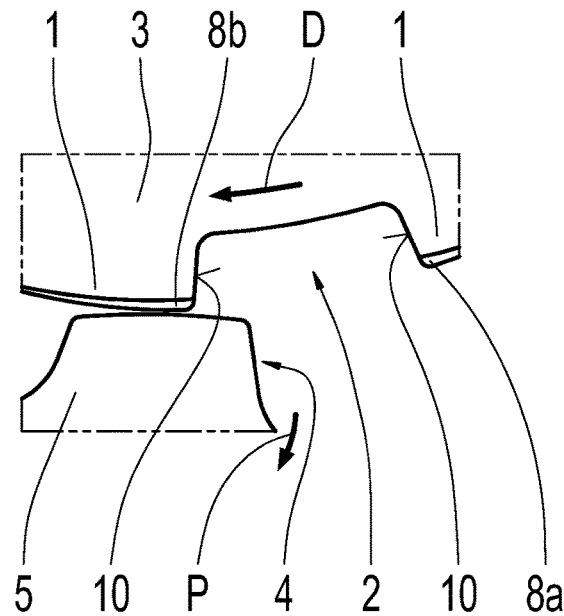
Fig. 1a  Fig. 1b
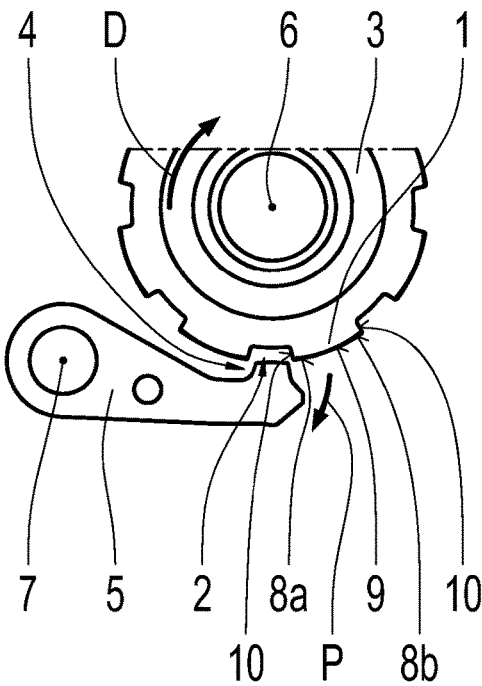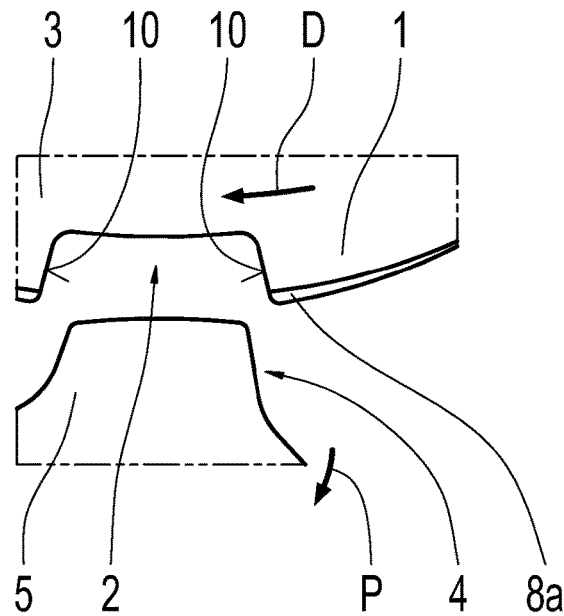
Fig. 2a  Fig. 2b

PARKING LOCK DEVICE FOR A MOTOR VEHICLE

FIELD OF THE INVENTION

The invention relates generally to a parking lock device for a motor vehicle, including a parking interlock gear including teeth and tooth gaps, as well as a parking pawl including a ratchet tooth.

BACKGROUND

A parking lock device for a motor vehicle is provided for preventing, in an actuated condition, the motor vehicle from rolling away. Generally, the parking interlock gear is arranged on a torsionally stiff input or output shaft. For example, in the case of an electric drive device for a motor vehicle, the parking interlock gear is arranged on a rotor shaft of the electric drive machine. The drive device usually interacts with a transmission device.

When the parking lock device is actuated, for example, on a hillside and in the towing operation of the motor vehicle, in order to interlock the drive train, the drive train winds up, due to the partially low component rigidity of the components located in the drive train and due, as well, to the transmission ratio step of the transmission device. Consequently, an elastic deformation of the components located in the drive train takes place. During the actuation of the parking lock device in order to disengage the parking lock, the drive train abruptly relaxes, wherein the parking pawl rattles on the parking interlock gear when the actuator system does not release the interlock between the parking pawl and the parking interlock gear rapidly enough. This is the case, in particular, when a disengagement speed of an interlocking element actuating the parking pawl is too low. The rattling causes high dynamic loads and impermissible wear on the components of the parking lock device. Wear results in changes in function-relevant component geometries and friction faces of the parking lock device. Furthermore, wear negatively influences the latching speeds, the power transmission capacity, the service life, the rattling characteristics, as well as the engagement and disengagement characteristics of the parking lock device. The abrupt relaxation of the drive train causes the drive train to swing in both directions of rotation and, therefore, causes the parking interlock gear to rotate in both directions of rotation. The oscillation amplitude decreases over time.

DE 10 2010 042 917 A1 describes a parking lock device for a motor vehicle. The parking lock device includes a parking interlock gear including teeth and tooth gaps, as well as a parking pawl including a ratchet tooth. The parking interlock gear executes a turning motion having a rotation angle and a rotational speed about an axis of rotation and the parking pawl executes a swiveling or pivoting motion having a swivel range and a swivel speed about a swivel axis. The swivel axis is arranged in parallel to the axis of rotation. Above a predefined engaging speed, the parking pawl is deflected by the teeth of the parking interlock gear and thereby undergoes an oscillating swiveling motion, a so-called rattling. The parking interlock gear and the parking pawl are kinematically linked to each other via a linear relation between the swivel range and the rotation angle while the tooth tips of the two components are in contact.

A parking lock device for a motor vehicle that, in particular, reduces the contact forces and the wear between the parking interlock gear and the parking pawl in a targeted rotational speed range would therefore be advantageous.

SUMMARY OF THE INVENTION

A parking lock device according to the invention for a motor vehicle includes a parking interlock gear including teeth and tooth gaps, as well as a parking pawl including a ratchet tooth, wherein the parking interlock gear executes a turning motion about an axis of rotation and the parking pawl executes a swiveling motion about a swivel axis which is arranged in parallel to the axis of rotation, or a translatory motion. The teeth on the parking interlock gear have a first and a second deflecting contour, wherein the first and the second deflecting contours are arranged on the respective tooth in a counter-revolving manner and radially increase from a radial indentation toward a respective tooth flank. The deflecting contours slidingly guide the ratchet tooth and, in a targeted rotational speed range of the parking interlock gear between a minimum limit speed and a maximum limit speed, catapult said ratchet tooth over a tooth gap adjacent to the respective tooth, in order to avoid contact of the tooth flanks of the parking pawl with tooth flanks of the parking interlock gear in the targeted rotational speed range.

The teeth and the tooth gaps are arranged on the parking interlock gear alternatingly along the circumferential direction. The plunging of the ratchet tooth into a tooth gap between two teeth can be interlocked by an actuator system. The tooth flanks of the teeth are designed such that, when the parking interlock gear executes a turning motion, the ratchet tooth is deflected by the tooth located in the direction of rotation, wherein the deflection of the ratchet tooth is referred to as rattling. The ratchet tooth of the parking pawl is therefore guided along the parking interlock gear rotating about the axis of rotation, wherein the parking pawl executes a swiveling motion about the swivel axis depending on the radial position on the parking interlock gear.

Every tooth on the parking interlock gear has two deflecting contours, wherein the two deflecting contours are arranged so as to revolve in opposite directions and a radial indentation is formed between the two deflecting contours. Consequently, the tooth tip is not cylindrical, but rather constricts radially, with respect to the cylindrical design, toward the indentation. In other words, the outer radius of the parking interlock gear on a respective tooth is greatest in the area of the tooth flanks on the tooth tip, wherein the outer radius of the parking interlock gear on a respective tooth is smallest in the radial indentation. The curvature of the tooth-tip contour on the respective tooth does not necessarily need to be constant across the entire length. In particular, the curvature of the tooth-tip contours is variable in sections. Transition radii are formed in the transition of a tooth tip to the tooth flanks.

The guidance of the ratchet tooth during a rotation of the parking interlock gear at a speed between a minimum limit speed and a maximum limit speed results in a radial deflection of the parking pawl via the deflecting contour of the parking interlock gear such that an adjacent tooth gap is jumped over. Consequently, the ratchet tooth does not plunge into the adjacent tooth gap, but rather initially lifts off of the respective deflecting contour and lands again on a deflecting contour of the next tooth in the direction of rotation. Due to the fact that the ratchet tooth is not deflected by the tooth flanks of a tooth in order to exit a tooth gap, the dynamics occurring during rattling and the resultant wear is reduced.

Consequently, the deflecting contours generate a ski-jump effect, wherein the ski-jump effect is at least so great that the ratchet tooth reliably hurtles over the adjacent tooth gap. The ski-jump effect is at most so great, however, that the parking pawl at most slightly touches a stop in the disengaged condition, so that the parking pawl is not reflected by said stop. The stop of the parking pawl limits the swiveling motion of the parking pawl toward one side, wherein the parking interlock gear limits the swiveling motion of the parking pawl toward another side. The swivel range of the parking pawl is at a minimum when the ratchet tooth has plunged completely into a tooth gap. In contrast, the swivel range of the parking pawl is at a maximum when the parking pawl comes to rest against the stop.

A minimum limit speed is understood to be a minimum rotational speed of the parking interlock gear, at which a jump over the tooth gap and a landing on the subsequent tooth may be implemented. Similarly, a maximum limit speed is understood to be a maximum rotational speed of the parking interlock gear, at which a jump over the tooth gap and a landing on the subsequent tooth may be implemented. The minimum and the maximum limit speeds are therefore limited to the targeted rotational speed range, wherein the targeted rotational speed range is application-specific.

An excitation of the parking pawl by the parking interlock gear increases as the speed of the parking interlock gear increases, whereby, starting at a minimum limit speed, the ski-jump effect occurs and is amplified as the speed increases. The two limit speeds depend on various parameters, for example, on a mass, a center of gravity, and an inertia moment of the parking pawl, but also, in particular, on the design of the deflecting contours on the parking interlock gear and on the design of the tooth-tip contour on the ratchet tooth.

The vibration characteristics of the drive train are decisive for a speed gradient and the minimum as well as maximum limit speeds after the disengagement of the parking lock. In particular, this is on parameters such as the inertia moments of the components located in the drive train as well as rigidities and ratios between driven vehicle wheels and the parking interlock gear. The heavier a motor vehicle is, which is stopped on a hillside, the greater the load is on the parking lock device in an interlocked condition, wherein the oscillating condition associated therewith is also amplified.

Preferably, the minimum limit speed is at least 300 rpm. Furthermore, the maximum limit speed is preferably at most 1500 rpm. Alternatively, the limit speed range of the parking interlock gear is between at least 700 rpm and at most 1200 rpm in order to catapult the ratchet tooth over the tooth gap on the adjacent tooth and, as a result, avoid contact of the tooth flanks of the parking pawl with the tooth flanks of the parking interlock gear in a targeted rotational speed range. Further alternatively, it is also conceivable to select the minimum and the maximum limit speeds as a function of a latching speed, wherein the latching speed is understood to be the speed at which the parking lock device locks and, therefore, the ratchet tooth engages, in a locking manner, into a tooth gap between two teeth. For example, the doubled latching speed is selected as the minimum limit speed, wherein the ten-fold latching speed is selected as the maximum limit speed.

Preferably, the radial indentation is formed, in the circumferential direction, between two counter-revolvingly arranged deflecting contours. According to one preferred exemplary embodiment, the radial indentation is formed, in the circumferential direction, between two counter-revolvingly arranged deflecting contours. Preferably, the two counter-revolvingly arranged deflecting contours on the respective tooth are identical. In particular, the respective tooth is symmetrical, wherein the deflecting contours are identical to each other. Upon actuation of the parking lock device in order to disengage the parking lock, the drive train abruptly relaxes, wherein the parking interlock gear swings in both directions of rotation. Therefore, it is advantageous to design the deflecting contours on the parking interlock gear such that the ski-jump effect occurs identically in both directions of rotation. Alternatively, it is also conceivable that the deflecting contours are direction-dependent and, therefore, not identical. Depending on the application, therefore, either a symmetrical or an asymmetrical design is implemented, wherein, for example, a direction of rotation of the parking interlock gear is selected as the preferred direction, wherein, in the preferred direction, the ski-jump effect is pronounced to a greater or lesser extent as compared to the other direction of rotation.

According to one preferred embodiment, the radial indentation is at least 0.1 mm deep. The larger the radial indentation is, the greater the ski-jump effect is. Furthermore, the ski-jump effect is greatest in a concave design of the deflecting contour, as compared to a convex or linear design of the deflecting contour.

In particular, the two counter-revolvingly arranged deflecting contours on the tooth are convex, concave, or linear. In other words, the curvature on the tooth tip is convex, concave, or linear or straight, in deviation from a cylindrical shape. The geometric design of the deflecting contours or the geometric design of the curvature on the tooth tip as well as the design of the radial indentation between the two deflecting contours depends on how powerfully or how far the ratchet tooth is to be catapulted over the tooth gap at a rotational speed.

Preferably, the ratchet tooth is convex, concave, or linear. The position, the type, and the extent of the curvature of the tooth tip of the ratchet tooth are designed similarly to the position, the type, and the extent of the curvature of the tooth tips on the parking interlock gear, depending on the system and the application. According to one preferred embodiment, a radial elevation of the convexly designed ratchet tooth corresponds to one-fifth or 20% of a face width of the ratchet tooth.

The design of the parking interlock gear and the parking pawl depends on various parameters, as described above, and preferably takes place iteratively with the aid of time simulations. For example, a number of teeth of the parking interlock gear, an outer diameter of the parking interlock gear, and a width of the tooth gaps on the parking interlock gear are initially determined. Furthermore, a pivot point of the parking pawl and the position of the ratchet tooth with respect to this pivot point are determined.

With the aid of an oscillation simulation of the drive train, the maximum limit speed is determined, wherein the rotational speed range between the minimum limit speed and the maximum limit speed is also selected to be as large as possible. In particular, the minimum limit speed results from the peripheral conditions of the system. In order to determine the maximum limit speed, a load on the drive train is simulated, which corresponds to a motor vehicle stopped on a hillside in the towing operation. The drive train preloaded with a maximum torque load is abruptly relaxed and the maximum limit speed is detected. The radial indentation and, therefore, also the radial height of the deflecting contours is selected such that the ski-jump effect is utilized to an optimal extent between the minimum and the maximum limit speeds. In particular, time simulations for the relaxation of the preloaded drive train are carried out while varying the deflecting-contour geometries and the tooth-tip geometries on the ratchet tooth, and the pulse of the parking pawl occurring after contact with the parking interlock gear is iteratively minimized during the rattling.

According to one preferred exemplary embodiment, the radial indentation is at least 0.1 mm deep in a speed range between 300 rpm and 1500 rpm, wherein the counter-revolvingly arranged deflecting contours on the respective tooth are convex, and wherein the ratchet tooth is also convex.

Preferably, the parking pawl always has linear contact and, therefore, no surface contact, to the tooth tip of the respective tooth of the parking interlock gear. In particular, the contour of the ratchet tooth is convex when the tooth contour on the respective tooth of the parking interlock gear is straight or concave. Given a convex tooth contour on the respective tooth of the parking interlock gear, a straight or concave contour of the parking pawl is also possible.

BRIEF DESCRIPTION OF THE DRAWINGS

Exemplary embodiments of the invention are explained in greater detail in the following with reference to the figures, wherein identical or similar elements are provided with the same reference characters. In the figures, the following is shown:

FIG. 1a shows a simplified schematic of a parking lock device according to the invention, wherein the parking pawl is arranged in a first position on the parking interlock gear, FIG. 1b shows a detailed schematic of the parking pawl on the parking interlock gear according to the first position represented in FIG. 1a, FIG. 2a shows a simplified schematic of the parking lock device according to the invention, wherein the parking pawl is arranged in a second position on the parking interlock gear, FIG. 2b shows a detailed schematic of the parking pawl on the parking interlock gear according to the second position represented in FIG. 2a, FIG. 3a shows a simplified schematic of the parking lock device according to the invention, wherein the parking pawl is arranged in a third position on the parking interlock gear.

DETAILED DESCRIPTION

Figure 3A:
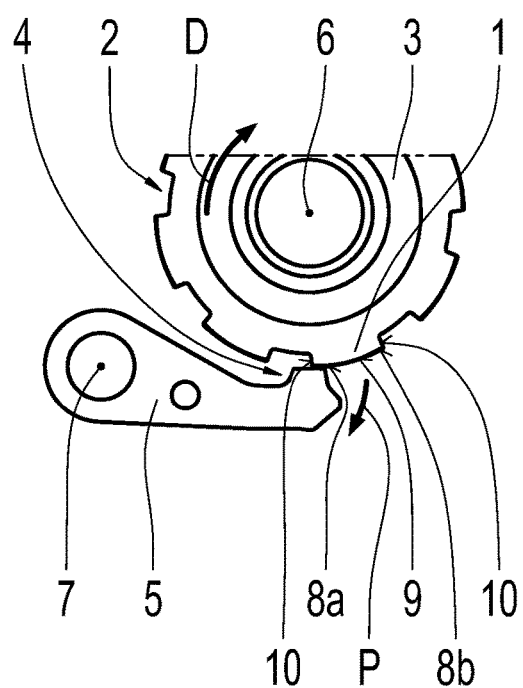
FIG. 3b shows a detailed schematic of the parking pawl on the parking interlock gear according to the third position represented in FIG. 3a, FIG. 4 shows a detailed schematic of a tooth of the parking interlock gear.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 3B:
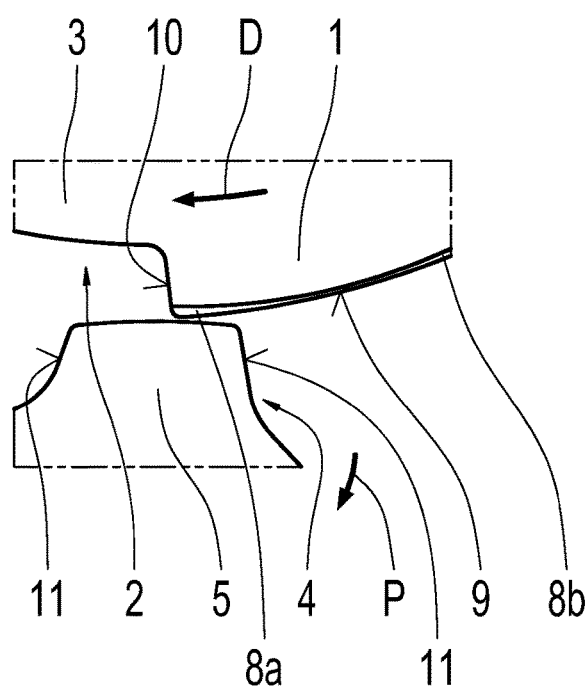

FIG. 1a through FIG. 3b show a parking lock device according to the invention for a motor vehicle (not represented here), wherein FIG. 1b, FIG. 2b, and FIG. 3b are detailed representations of FIG. 1a, FIG. 2a, and FIG. 3a, respectively. The parking lock device is not completely represented. In the present case, a parking interlock gear 3 including teeth 1 and tooth gaps 2, as well as a parking pawl 5 including a ratchet tooth 4 are shown. The parking pawl 5 is utilized for blocking or preventing a rotation of the parking interlock gear 3 and, for this purpose, the ratchet tooth 4 of the parking pawl 5 engages or enters into one of the tooth gaps 2 on the parking interlock gear 3. The above-described interlock position is blockable by an actuator (not represented here). The parking lock device is provided, in particular, for a transmission of an electrically driven motor vehicle and is utilized for mechanically interlocking a rotor shaft (not represented here) in order to prevent the motor vehicle from rolling away. For this purpose, the parking interlock gear 3 is connected in a rotationally fixed manner to the rotor shaft and executes a turning motion or rotation about an axis of rotation 6 in the direction of the arrow D. The parking pawl 5 is pivotably mounted in a transmission housing (not represented here) and executes, as a function of the parking interlock gear 3, a swiveling or rotating motion about a swivel axis 7 in the direction of the arrow P. The swivel axis 7 is arranged parallel to the axis of rotation 6. Alternatively, and not represented here, it is also conceivable that the parking pawl 5 executes a translational motion instead of the swiveling motion about the swivel axis 7.

Figure 4:
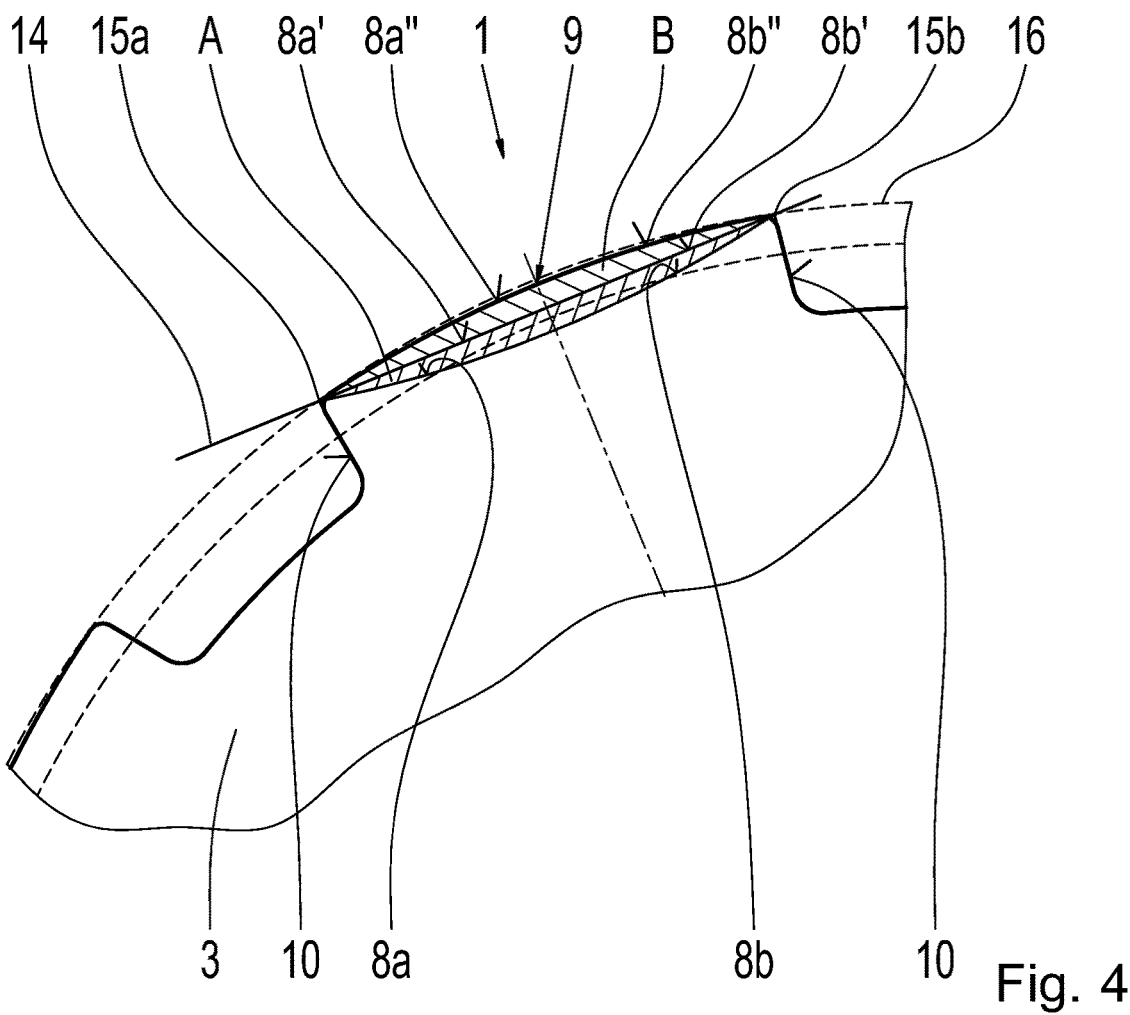

Each of the teeth 1 on the parking interlock gear 3 have a first and a second deflecting contour 8a, 8b, wherein the first and the second deflecting contours 8a, 8b are arranged on the respective tooth 1 so as to revolve in opposite directions and radially increase from a radial indentation 9 toward a respective tooth flank 10. The deflecting contours 8a, 8b are provided for slidingly guiding the ratchet tooth 4 and, to catapult said ratchet tooth over a tooth gap 2 adjacent to the respective tooth 1, in a targeted speed range of the parking interlock gear 3 between a minimum limit speed and a maximum limit speed, in order to avoid contact of the tooth flanks 10 of the parking interlock gear 3 with tooth flanks 11 of the parking pawl 5 in the targeted speed range. As a result, the contact forces and the wear between the parking interlock gear 3 and the parking pawl 5 are reduced in the targeted speed range. Each of the radial indentations 9 is formed in the center of a respective one of the teeth 1 along the circumferential direction between two counter-revolvingly arranged deflecting contours 8a, 8b. FIG. 4 shows an enlarged representation of the parking interlock gear 3, wherein, according to FIG. 4, three possible exemplary embodiments of the deflecting contours 8a, 8b are represented.

The effect of catapulting the parking pawl 5 over the tooth gap 2 is referred to, according to the invention, as the ski-jump effect. The ski-jump effect considerably reduces the wear and the noise levels of the parking lock device, in that the contact of the parking pawl 5 on the parking interlock gear 3 is avoided in the targeted speed range. This is the case, in particular, when the parking lock is disengaged and the drive train is greatly preloaded. For example, wear is increased by contact of the tooth flanks 11 of the parking pawl 5 with the tooth flanks 10 of the parking interlock gear 3 during the disengagement of the parking lock of a heavily loaded motor vehicle on a hillside.

According to FIG. 1a and FIG. 1b, a first position is represented, in which the parking interlock gear 3 rotating in the clockwise direction, in particular the tooth 1 of the parking interlock gear 3, touches the ratchet tooth 4. In the present case, the parking interlock gear 3 rotates at a speed of 1100 rpm. Due to the second deflecting contour 8b formed on the tooth 1, the parking pawl 5 is accelerated in the direction of the arrow P. After exiting the second deflecting contour 8b, the parking pawl 5 moves further in the direction of the arrow P against a spring force of a spring (not represented here) acting at least indirectly on the parking pawl 5.

According to FIG. 2a and FIG. 2b, a second position is represented, in which the ratchet tooth 4 hurtles over the tooth gap 2. At this point, only the spring force still acts on the parking pawl 5 in the direction of the parking interlock gear 3. Consequently, the parking pawl 5 is headed for a landing onto the first deflecting contour 8a of the tooth 1 located in the direction of rotation.

According to FIG. 3a and FIG. 3b, a third position is represented, in which the ratchet tooth 4, after having hurtled over the tooth gap 2, lands onto the first deflecting contour 8a of the tooth 1 arranged in the direction of rotation. The tooth flanks 10 of the teeth 1 on the parking interlock gear 3 do not come to rest against the tooth flanks 11 of the ratchet tooth 4.

Consequently, the parking pawl 5, after having exited the second deflecting contour 8b, initially moves further in the direction of disengagement according to the arrow P, reverses after having reached a vertex, and moves in the direction of the parking interlock gear 3 until impacting the deflecting contour 8a of the tooth 1 arranged in the direction of rotation.

At a minimum limit speed of 700 rpm, the limit for the ski-jump effect has been reached in this case, and therefore the parking pawl 5, when exiting the deflecting contour 8b of the parking interlock gear 3, no longer moves in the direction of disengagement according to the arrow P, but rather directly begins an accelerated engagement motion in the direction of the parking interlock gear 3.

FIG. 4 shows a sectioning of a tooth 1 of the parking interlock gear 3, wherein a first and a second shaded area A and B on the tooth 1 are provided in order to illustrate three possible exemplary embodiments. If the first and the second shaded areas A and B on the tooth 1 are omitted, two counter-revolvingly arranged deflecting contours 8a, 8b on the tooth 1 are identical and concave. If only the second shaded area B on the tooth 1 is omitted, two counter-revolvingly arranged deflecting contours 8a', 8b' are formed on the tooth 1 so as to be identical and linear. Furthermore, two counter-revolvingly arranged deflecting contours 8a", 8b" are formed on the tooth 1 so as to be convex if the shaded areas A and B are formed on the tooth 1, wherein a radial indentation 9 is at least 0.1 mm deep. The radial indentation 9 is formed in the center of the tooth 1 along the circumferential direction between two counter-revolvingly arranged deflecting contours 8a, 8b, 8a', 8b', 8a", 8b".

In other words, the design area for the tooth-tip contour on the teeth 1 of the parking interlock gear 3 is determined via a secant 14 which extends through a first and a second point of intersection 15a, 15b of the outer diameter 16 of the parking-lock tooth system with the tooth flanks 10 of the teeth 1. The tooth-tip contour extends straight along the secant 14, convexly, or concavely. The area for a convex contour is implemented by forming the second shaded area B on the secant 14. The radial indentation 9 with respect to a cylindrical contour having the outer diameter 16 is 0.1 mm deep. In order to form a concave tooth-tip contour on the tooth 1, the second shaded area B is removed from a straight tooth 1 along the secant 14. The first shaded area A corresponds to a mirror image of the second shaded area B on the secant 14.

Figure 5:
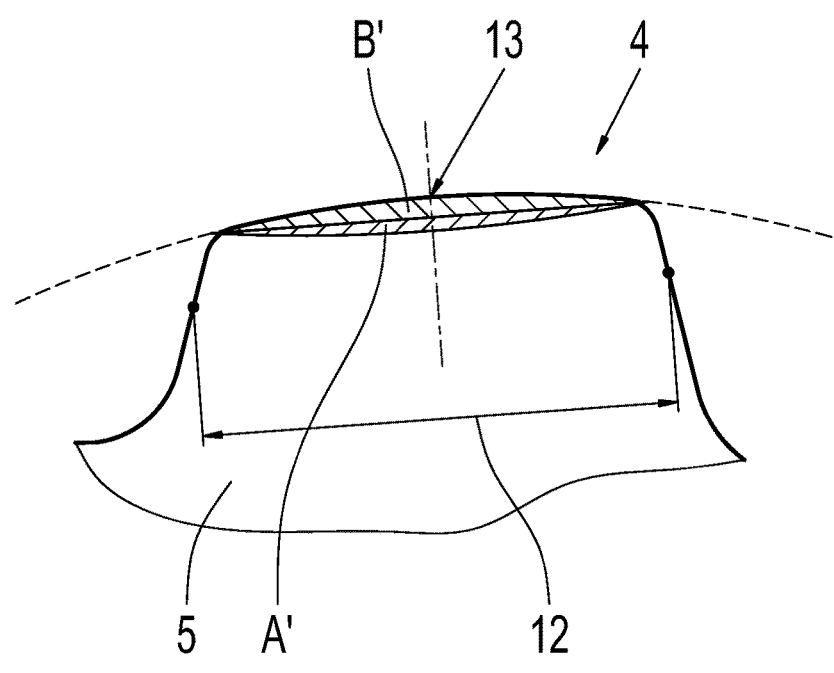
FIG. 5 shows a detailed schematic of a ratchet tooth of the parking pawl.

FIG. 5 shows a sectioning of a ratchet tooth 4 of the parking pawl 5, wherein a first and a second shaded area A' and B' are provided on the ratchet tooth 4 in order to illustrate three possible exemplary embodiments. If the first and the second shaded areas A' and B' on the ratchet tooth 4 are omitted, the ratchet tooth 4 is concave. If only the second shaded area B' on the ratchet tooth 4 is omitted, the ratchet tooth 4 is linear or straight. Furthermore, the ratchet tooth 4 is convex if the shaded areas A' and B' are formed on the ratchet tooth 4, wherein a radial elevation 13 of the convex ratchet tooth 4 corresponds to 20% of a face width 12 of the ratchet tooth 4. The radial elevation 13 is formed in the center of the ratchet tooth 4 along the circumferential direction.

Modifications and variations can be made to the embodiments illustrated or described herein without departing from the scope and spirit of the invention as set forth in the appended claims.

REFERENCE CHARACTERS 1 tooth
2 tooth gap
3 parking interlock gear
4 ratchet tooth
5 parking pawl
6 axis of rotation
7 swivel axis
8a first deflecting contour
8b second deflecting contour
8a' first deflecting contour
8b' second deflecting contour
8a" first deflecting contour
8b" second deflecting contour
9 radial indentation
10 tooth flank
11 tooth flank
12 face width
13 radial elevation
14 secant
15a first point of intersection
15b second point of intersection
16 outer diameter
A first shaded area on the tooth
B second shaded area on the tooth
A' first shaded area on the tooth
B' second shaded area on the tooth
D arrow
P arrow

The invention claimed is:

1. A parking lock device for a motor vehicle, comprising:
a parking interlock gear (3) including teeth (1) and tooth gaps (2), wherein each of the teeth (1) has a first deflecting contour (8a) and a second deflecting contour (8b), the first and the second deflecting contours (8a, 8b) being counter-revolving and radially increasing from a radial indentation (9) toward a respective tooth flank (10) on a respective one of the teeth (1), and
a parking pawl (5) including a ratchet tooth (4),
wherein the parking interlock gear (3) is rotatable about an axis of rotation (6) and the parking pawl (5) is rotatable about or translational along a swivel axis (7) arranged parallel to the axis of rotation (6),
wherein the deflecting contours (8a, 8b) slidingly guide the ratchet tooth (4) to catapult said ratchet tooth (4) over a respective one of the tooth gaps (2) adjacent to the respective one of the teeth (1) in a targeted rotational speed range of the parking interlock gear (3), the targeted rotational speed range being between a minimum limit speed (U) and a maximum limit speed (O), such that contact is avoided between tooth flanks (11) of the parking pawl (5) and the tooth flanks (10) of the parking interlock gear (3) in the targeted rotational speed range.

2. The parking lock device of claim 1, wherein each of the radial indentations (9) is centered along the circumferential direction between the first and second deflecting contours (8a, 8b) of the respective one of the teeth (1).

3. The parking lock device of claim 2, wherein the first and second deflecting contours (8a, 8b) on the respective one of the teeth (1) are identical.

4. The parking lock device of claim 2, wherein the first and second deflecting contours (8a, 8b) on the respective one of the teeth (1) are convex, concave, or linear.

5. The parking lock device of claim 1, wherein each of the radial indentations (9) has a depth of at least one-tenth of a millimeter.

6. The parking lock device of claim 1, wherein the ratchet tooth (4) is convex, concave, or linear.

7. The parking lock device of claim 6, wherein a radial elevation (13) of the convex ratchet tooth (4) is equal to one-fifth of a face width (12) of the ratchet tooth (4).

8. The parking lock device of claim 1, wherein the minimum limit speed (U) is at least three hundred rotations per minute.

9. The parking lock device of claim 1, wherein the maximum limit speed (O) is at most fifteen hundred rotations per minute.

10. A parking lock device for a motor vehicle, comprising:
a parking interlock gear (3) including teeth (1) and tooth gaps (2), wherein each of the teeth (1) has a first deflecting contour (8a) and a second deflecting contour (8b), the first and the second deflecting contours (8a, 8b) being counter-revolving and radially increasing from a radial indentation (9) toward a respective tooth flank (10) on a respective one of the teeth (1), and
a parking pawl (5) including a ratchet tooth (4),
wherein the parking interlock gear (3) is rotatable about an axis of rotation (6) and the parking pawl (5) is rotatable about or translational along a swivel axis (7) arranged parallel to the axis of rotation (6),
wherein the deflecting contours (8a, 8b) slidingly guide the ratchet tooth (4) to catapult said ratchet tooth (4) over a respective one of the tooth gaps (2) adjacent to the respective one of the teeth (1) in a targeted rotational speed range of the parking interlock gear (3), the targeted rotational speed range being between a minimum limit speed (U) and a maximum limit speed (O), such that contact is avoided between tooth flanks (11) of the parking pawl (5) and the tooth flanks (10) of the parking interlock gear (3) in the targeted rotational speed range, and
wherein the first and second deflecting contours (8a, 8b) on each of the teeth (1) are convex or concave.

* * * * *